US011763509B2

(12) United States Patent
Iqbal et al.

(10) Patent No.: US 11,763,509 B2
(45) Date of Patent: Sep. 19, 2023

(54) FRAME CALIBRATION FOR ROBUST VIDEO SYNTHESIS

(71) Applicant: Lenovo (Singapore) Pte. Ltd., Singapore (SG)

(72) Inventors: Ikhwan Mohammad Iqbal, Kanagawa (JP); Qiang Yao, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 100 days.

(21) Appl. No.: 17/454,906

(22) Filed: Nov. 15, 2021

(65) Prior Publication Data

US 2023/0154087 A1    May 18, 2023

(51) Int. Cl.
| | |
|---|---|
| *G06T 13/40* | (2011.01) |
| *G06T 15/20* | (2011.01) |
| *G06T 7/80* | (2017.01) |
| *G06T 7/73* | (2017.01) |
| *G06T 3/40* | (2006.01) |
| *G06V 20/40* | (2022.01) |
| *G06V 40/16* | (2022.01) |

(52) U.S. Cl.
CPC ............... *G06T 13/40* (2013.01); *G06T 3/40* (2013.01); *G06T 7/74* (2017.01); *G06T 7/80* (2017.01); *G06T 15/205* (2013.01); *G06V 20/46* (2022.01); *G06V 40/165* (2022.01); *G06V 40/171* (2022.01); *G06V 40/172* (2022.01); *G06T 2207/10016* (2013.01); *G06T 2207/30201* (2013.01); *G06T 2215/16* (2013.01)

(58) Field of Classification Search
None
See application file for complete search history.

(56) References Cited

U.S. PATENT DOCUMENTS

| | | | | |
|---|---|---|---|---|
| 2010/0007665 A1* | 1/2010 | Smith | ..................... | G06T 13/40 345/473 |
| 2019/0138793 A1* | 5/2019 | Rodriguez | ........... | G06V 40/166 |
| 2020/0272806 A1* | 8/2020 | Walker | ................ | G06V 40/167 |
| 2022/0130104 A1* | 4/2022 | Serry | ........................ | G06T 3/40 |
| 2022/0398797 A1* | 12/2022 | Phan | ..................... | G06V 20/46 |

OTHER PUBLICATIONS

Siarohin et al.; "First Order Motion Model for Image Animation"; 33rd Conference on Neural Information Processing Systems (NeurIPS 2019), Vancouver, Canada; Feb. 29, 2020 (11 pages).

* cited by examiner

*Primary Examiner* — Peter Hoang
(74) *Attorney, Agent, or Firm* — Osha Bergman Watanabe & Burton LLP

(57) ABSTRACT

A method for calibrating an animation includes obtaining a static source image of a source face; capturing, by an image capturing device, a driving video of a human; determining whether a driving face, of the human, is present in each of the video frames; measuring a driving face position and a driving face size in a calibration reference frame of the driving video; generating each of one or more modified video frames based on the calibration reference frame and each of one or more subsequent video frames; and outputting, for each of the driving video frames, the source image in response to determining that the driving face is not present, and outputting the source image and the modified video frame in response to determining that the driving face is present.

18 Claims, 6 Drawing Sheets

Driving Video 402

Calibration Reference Frame 403

Driving Video 402

Static Image 404

FRAME CALIBRATION FOR ROBUST VIDEO SYNTHESIS

BACKGROUND

Many situations exist where it is desirable to be able to animate static images based on live or stored video data. For example, animating a publicly viewable static image of a face, while keeping hidden the video data driving the animation, could enhance user privacy. Similarly, this type of process could preserve anonymity of a user, while still allowing for a video call experience. As another example, such technology could be used as an effect in filmmaking Computer models exist for creating such animations. When the location or size of the face of a human subject, within the field of view of the video that is driving the animation, is mismatched with the location or size of the face in the static image that is being animated, the final animation will likely have distortions. Similarly, if the subject of the driving video moves to one side of the field of view, moves closer or further away from the camera, or if the subject moves out of the field of view altogether, the animation of the static image may have significant distortions.

SUMMARY

In general, one or more embodiments of the invention relate to a method for calibrating an animation, the method comprising: obtaining a static source image of a source face; capturing, by an image capturing device, a driving video of a human, wherein the driving video comprises a plurality of driving video frames; determining whether a driving face, of the human, is present in each of the video frames; measuring a driving face position and a driving face size in a calibration reference frame of the driving video; generating each of one or more modified video frames based on the calibration reference frame and each of one or more subsequent video frames, wherein the generating comprises: determining whether a measured offset, between the driving face position and an ideal face position, has a magnitude greater than a translation threshold, determining whether a measured scale factor, between the driving face size and an ideal face size, is greater than a scaling threshold, translating the one or more subsequent video frames, by a corrective offset, with respect to a fixed boundary box, in response to determining that the magnitude of the measured offset is greater than the translation threshold, and scaling the one or more subsequent video frames by a corrective scale factor, with respect to the fixed boundary box, in response to determining that the measured scale factor is greater than the scaling threshold, and outputting, for each of the driving video frames, the source image in response to determining that the driving face is not present, and outputting the source image and the modified video frame in response to determining that the driving face is present.

One or more embodiments of the invention relate to a non-transitory computer readable medium (CRM) storing computer readable program code for calibrating an animation, the computer readable program code causes a computer to: obtain a static source image of a source face; capture, by an image capturing device, a driving video of a human, wherein the driving video comprises a plurality of driving video frames; determine whether a driving face, of the human, is present in each of the video frames; measure a driving face position and a driving face size in a calibration reference frame of the driving video; generate each of one or more modified video frames based on the calibration reference frame and each of one or more subsequent video frames, wherein the generating comprises: determining whether a measured offset, between the driving face position and an ideal face position, has a magnitude greater than a translation threshold, determining whether a measured scale factor, between the driving face size and an ideal face size, is greater than a scaling threshold, translating the one or more subsequent video frames, by a corrective offset, with respect to a fixed boundary box, in response to determining that the magnitude of the measured offset is greater than the translation threshold, and scaling the one or more subsequent video frames by a corrective scale factor, with respect to the fixed boundary box, in response to determining that the measured scale factor is greater than the scaling threshold, and output, for each of the driving video frames, the source image in response to determining that the driving face is not present, and output the source image and the modified video frame in response to determining that the driving face is present.

One or more embodiments of the invention relate to a system for calibrating an animation, the system comprising: a memory that stores a static source image of a source face; an image capturing device that captures a driving video of a human, wherein the driving video comprises a plurality of driving video frames; a processor coupled to the image capturing device and the memory, wherein the processor: obtains the static source image; determines whether a driving face, of the human, is present in each of the video frames; measures a driving face position and a driving face size in a calibration reference frame of the driving video; generates each of one or more modified video frames based on the calibration reference frame and each of one or more subsequent video frames, wherein the generating comprises: determining whether a measured offset, between the driving face position and an ideal face position, has a magnitude greater than a translation threshold, determining whether a measured scale factor, between the driving face size and an ideal face size, is greater than a scaling threshold, translating the one or more subsequent video frames, by a corrective offset, with respect to a fixed boundary box, in response to determining that the magnitude of the measured offset is greater than the translation threshold, and scaling the one or more subsequent video frames by a corrective scale factor, with respect to the fixed boundary box, in response to determining that the measured scale factor is greater than the scaling threshold; and outputs, for each of the driving video frames, the source image in response to determining that the driving face is not present, and outputs the source image and the modified video frame in response to determining that the driving face is present.

Other aspects of the invention will be apparent from the following description and the appended claims.

DETAILED DESCRIPTION

Figure 1:
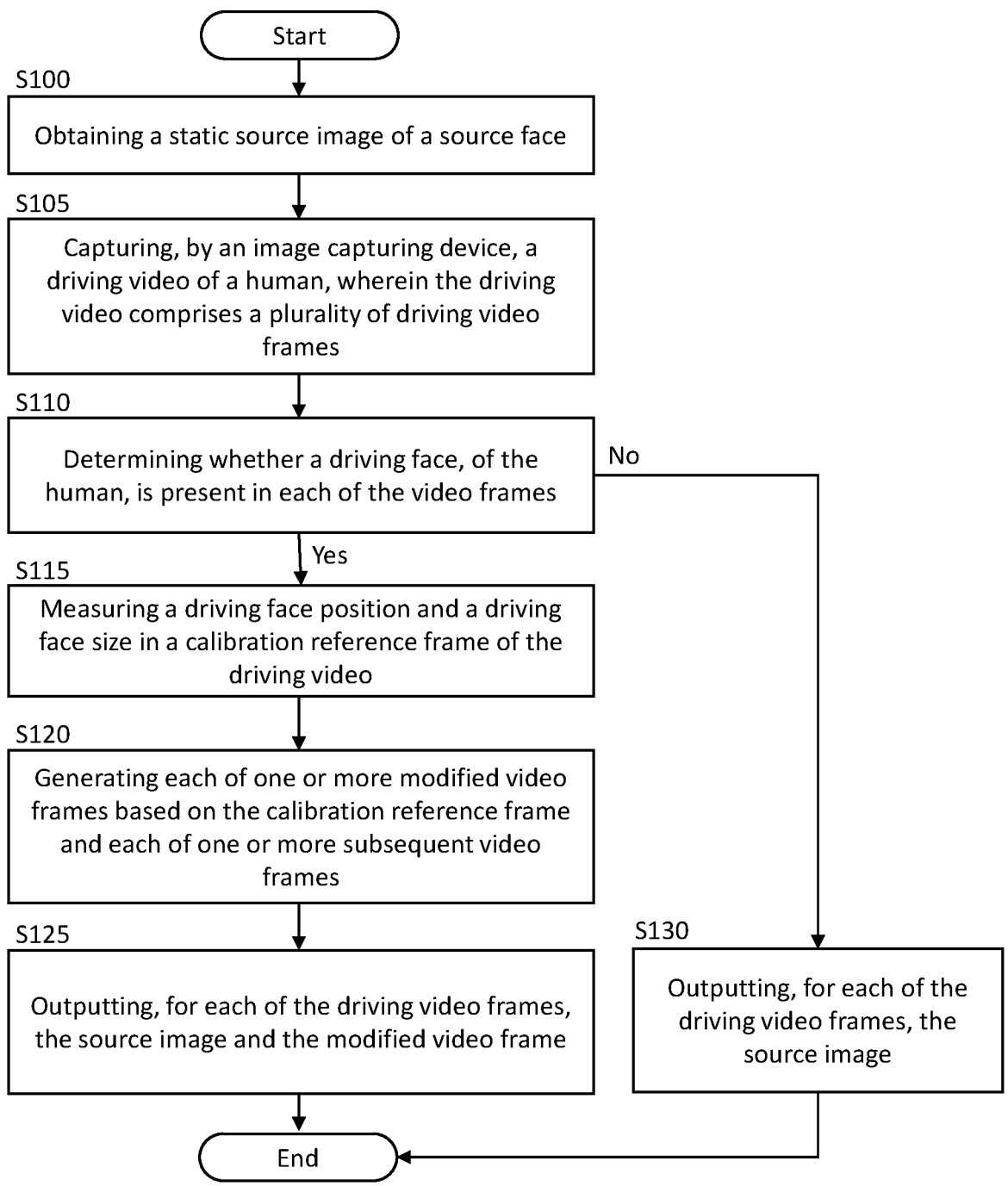
FIG. 1 shows a flowchart of a method for calibrating an animation in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g. first, second, third) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

In general, embodiments of the invention provide a method, non-transitory computer readable medium (CRM), and a system for calibrating an animation. A static source image is obtained, and a driving video is captured by an image capturing device. The static source image is a single, static image of a face (referred to as the source face) that will be animated based on the motions of a human in the driving video. According to one or more embodiments, the driving video may be calibrated to ensure high quality animation as follows. For every frame of the driving video, it is determined whether the human's face (referred to as the driving face) is present in the frame. For certain frames of the driving video, called calibration reference frames, the size and the position of the driving face in the video frames is measured. It is determined whether the size of the driving face is scaled by more than a threshold from an ideal face size, and it is determined whether the position of the driving face is offset by more than a threshold from an ideal face position. If the measured size and/or position is beyond the threshold, then the subsequent frames of the driving video are corrected or calibrated such that the driving face in the driving video remains close to the ideal face size and position. After checking for the presence of the driving face within the driving video, and correcting for size and position, the static source image and driving video frames are output to a motion estimator for animating the image.

Alternatively, if the face was not present in the driving video, then no corrections are made, and only the static source image is output, thereby stopping animation so that only the static source image is displayed.

FIG. 1 shows a flowchart of a method for calibrating an animation in accordance with one or more embodiments of the invention. In one or more embodiments, one or more of the steps shown in FIG. 1 may be combined, omitted, repeated, and/or performed in a different order than the order shown in FIG. 1. Accordingly, the scope of the invention should not be considered limited to the specific arrangement of steps shown in FIG. 1.

In STEP S100, a processor obtains a static source image of a source face. The static source image may be any photo, drawing, rendering, or depiction of a face, and the face may be any face of a human, animal, animated or drawn character, emoji, or any depiction recognizable as a face by facial recognition software. In other words, the static source image includes sufficient facial features such that a preferred facial recognition algorithm is able to detect the presence of a face. In one embodiment, the static source image includes sufficient facial features that allows a keypoint detection facial recognition algorithm to detect a plurality of keypoints and calculate a feature map value based thereon. The static source image may be any image file type or format. The processor may obtain the static source image from any memory, storage device, network, or other location where the image could be stored. The processor may be any information processing device, including but not limited to a CPU, GPU, chipset, or any other information processor.

In STEP S105, an image capturing device captures a driving video of a human. The driving video is used to drive the animation of the static source image. In other words, the driving video is a video from which the motions of the human are captured, and these motions are used to generate similar motions of the source face in the static source image. The driving video comprises a plurality of driving video frames, where each frame is a single image at one point in time of the video. The driving video may be any video file type or format. The image capturing device may be any device that can acquire images or video. In one or more embodiments, the image capturing device may be a camera that captures live video data in real time. In one or more embodiments, the face of the human in the driving video may be the same as the source face, or the faces may be different.

In STEP S110, the processor determines whether a driving face is present in each of the video frames. Hereinafter, the term driving face is used to represent the face of the human in the driving video. In one or more embodiments, this step is performed in real time on live video data. Additional details about determining the presence of the face will be provided in the discussion of FIG. 2. If no face is detected in a particular frame of the driving video, then the following STEPs S115, S120, and S125 are bypassed, and the processor only performs STEP S130. Alternatively, if the driving face is detected, then the processor performs STEPS S115, S120, and S125, and STEP S130 is bypassed.

In STEP S115, the processor measures the driving face position and size in a calibration reference frame of the driving video. The calibration reference frame is one frame of the driving video that is selected as the reference to which measurements and corrections to the driving video frames will be made. The calibration reference frame may be selected by a triggering event, or the calibration reference frame may be continuously updated with a predetermined periodicity (i.e. at regular intervals). If the calibration reference frame is selected by a triggering event, then any number of triggering events may occur in succession, and each event triggers the selection of a new calibration reference frame and the application of any corrections discussed in the steps below with respect to the new calibration reference frame. Similarly, if the calibration reference frame is continuously updated at regular intervals, then each new update also reapplies any corrections discussed in the steps below. Alternatively, the triggering event may be a keystroke on a computer keyboard, a pressed button in software, or may be the detection of the driving face discussed in STEP S110. In one or more embodiments, an initial calibration reference frame may be automatically selected as the first frame of the driving video in response to beginning capturing of the driving video by the image capturing device.

The processor may measure the position and the size of the driving face with respect to a fixed boundary box. The boundary box is an imaginary rectangle that remains fixed in position and size. In one or more embodiments, the boundary box is defined by a boundary box width, height, and position. The boundary box width and the boundary box height define the boundary box size. The boundary box position may be defined by the coordinates of one corner of the boundary box.

In one or more embodiments, the driving face position and size may be determined by facial recognition. Any facial recognition process may be used to determine the driving face position and size, including facial recognition processes that rely on machine learning. In one or more embodiments, the driving face size and position may be represented as a driving face box, or a rectangular boundary that encloses the driving face. The driving face box may be defined by a driving face box width, height, and position. The driving face box width and the driving face box height define the driving face box size. The driving face box position may be defined by the coordinates of the corner of the driving face box that corresponds to the similar corner of the fixed boundary box. For example, if the position of the fixed boundary box is defined by the lower left corner (e.g., point $P_1$ in FIG. 4C) of the fixed boundary box, then the lower left corner (e.g., point $P_2$ in FIG. 4C) of the driving face box is a convenient choice to define the driving face box position. In one or more embodiments, the driving face box position may be defined as the offset between these points (e.g., points $P_1$, $P_2$ in FIG. 4C).

In STEP S120, the processor generates each of one or more modified video frames based on the calibration reference frame and each of one or more subsequent video frames. The modified video frames may be offset or translated in position with respect to the original driving video frames and/or may be scaled up or down in size with respect to the original driving video frames. In other words, the video frames are corrected in position and size, depending upon the measurements made of the driving face position and size in STEP S115, such that the driving face remains in an ideal position to ensure high quality animation of the static source image. In this way, the driving face from the driving video can be shifted in position and size such that it remains comparable in size and position to the source face in the static source image, thereby ensuring higher quality animation of the static source image. More details concerning generating the modified video frames will be discussed in the discussion for FIG. 3.

In STEP S125, the processor outputs both the static source image and the modified video frame. In this way high-quality animation, without distortions, can be maintained by using video frames that are corrected for position and scale, when the driving face is present in the driving video.

In STEP S130, the processor outputs only the static source image, in response to the processor determining that the driving face is not present in the driving video frame in STEP S110. In this way, if no face was detected in the driving video frame, then no corrections or calibrations are applied, and only the static source image is output for display to a user. Effectively the animation of the static source image is halted when no driving face is present in the driving video.

Figure 2:
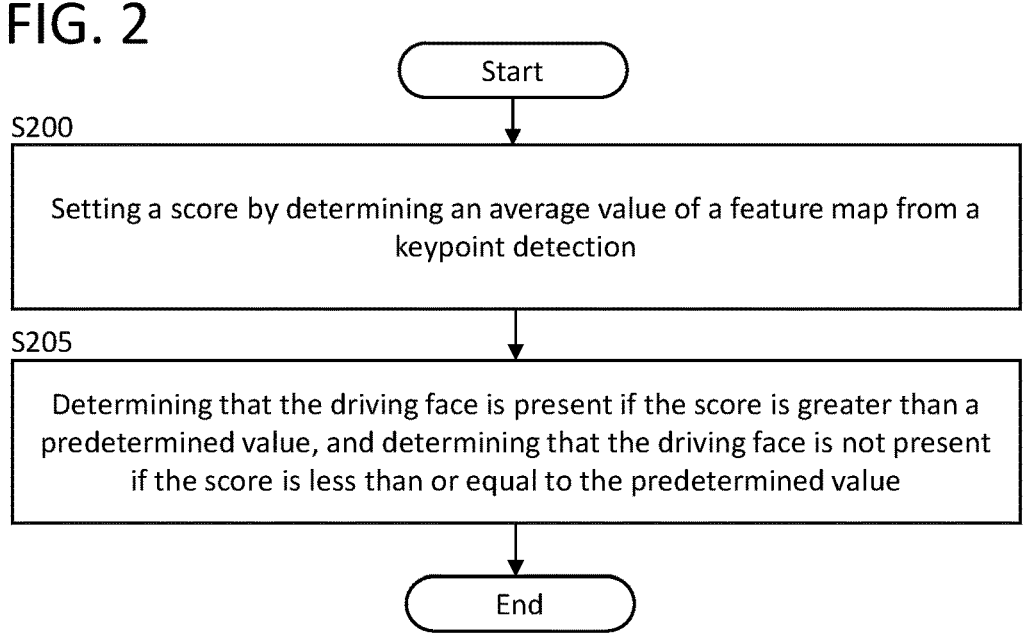
FIG. 2 shows a flowchart of a method for determining whether a driving face is present within frames of a driving video, in accordance with one or more embodiments of the invention.

FIG. 2 shows a flowchart of a method for determining whether the driving face is present in each of the video frames, in accordance with one or more embodiments of the invention. FIG. 2 provides more detail concerning the underlying steps of STEP S110 in FIG. 1. In one or more embodiments, one or more of the steps shown in FIG. 2 may be combined, omitted, repeated, and/or performed in a different order than the order shown in FIG. 2. Accordingly, the scope of the invention should not be considered limited to the specific arrangement of steps shown in FIG. 2.

In STEP S200, the processor sets a score by determining an average value of a feature map obtained from a keypoint detection. Any keypoint detection operation may be used for detecting facial keypoints in a frame of the driving video. In one or more embodiments, the keypoint detection operation may be an unsupervised keypoint detection performed by a convolutional neural network. In one or more embodiments, filters, or kernels, may be convolved with an image (a frame from the driving video). After one or more of these convolution operations, a feature map is determined, where the feature map is a multi-dimensional matrix where the elements of the matrix represent the presence of facial features in the original image. By averaging over the elements of the feature map, a score may be obtained that is indicative of the presence of a face within the frame of the driving video.

In STEP S205, the processor determines that the driving face is present in the driving video if the score is equal to or larger than the predetermined value. Conversely the processor determines that the driving face is not present if the score is less than or equal to the predetermined value. In one or more embodiments, the predetermined value may be determined empirically based on determining a score value, above which a face is likely to be present. If the score is determined to be less than or equal to the predetermined value, then the processor determines that no face is currently present in the driving video. If the score is determined to be greater than the predetermined value, then the processor determines that the driving face is currently present in the driving video.

Figure 3:
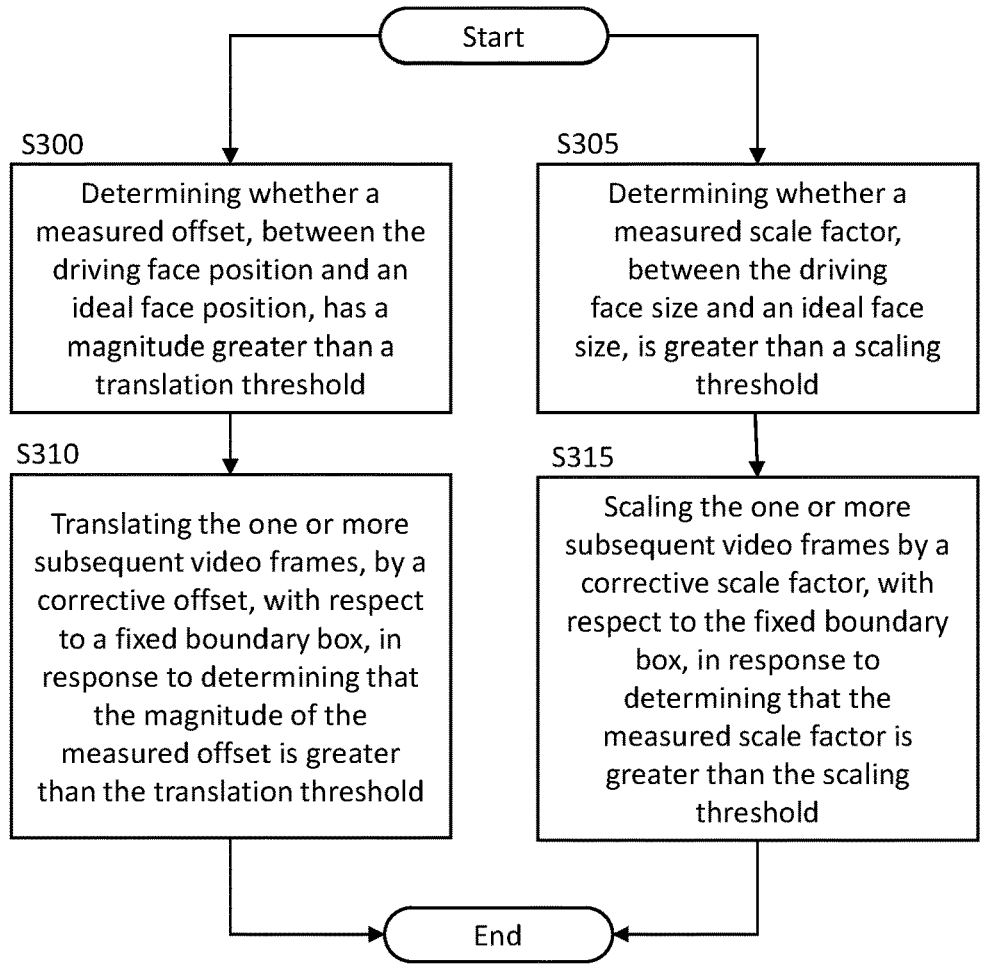
FIG. 3 shows a flowchart of a method for generating a modified video frame based on a calibration reference frame and each of one or more subsequent video frames, in accordance with one or more embodiments of the invention.

FIG. 3 shows a flowchart of a method for generating the modified video frame based on the calibration reference frame and each of the subsequent video frames, in accordance with one or more embodiments of the invention. FIG. 3 provides more detail concerning the underlying steps of STEP S120 in FIG. 1. In one or more embodiments, one or more of the steps shown in FIG. 3 may be combined, omitted, repeated, and/or performed in a different order than the order shown in FIG. 3. Accordingly, the scope of the invention should not be considered limited to the specific arrangement of steps shown in FIG. 3.

In STEP S300, the processor determines whether a measured offset, between the driving face position and an ideal face position, has a magnitude greater than a translation threshold. The ideal face position may be defined by the condition where the driving face box position is located at a predetermined ideal offset from the boundary box position.

In one or more embodiments, the ideal face position may be chosen to be a position where the face position is centered within the fixed boundary box. In other embodiments, any other predetermined position may also be chosen as the ideal face position, where the ideal face position is similar to the face position in the static source image. The translation threshold is a numerical value such that if the magnitude of the measured offset between the driven face position and the ideal face position is larger than the translation threshold, then corrective translating (i.e. shifting) of the driving video frames will be performed in order to keep the driving face close to the ideal face position. In one or more embodiments, the translation threshold may be defined to have a different value for different directions of measured offsets. For example, a different threshold value may be defined for the up, down, left, and right offset directions, depending on the requirements of a particular animation. Alternatively, in other embodiments, the translation threshold may be chosen to have the same value in every direction.

In STEP S305, the processor determines whether a measured scale factor, between the driving face size and an ideal face size, is greater than a scaling threshold. The ideal face size may be defined by a condition where the driving face box width is a predetermined fraction of the boundary box width within a width error tolerance and the driving face box height is a predetermined fraction of the boundary box height within a height error tolerance. The ideal face size may be chosen to be any size. In one or more embodiments, the ideal face size is chosen such that the size of the driving face is kept similar to the size of the source face in the static source image. The scaling threshold is a numerical value such that if the value of the measured scale factor is larger than the scaling threshold, then corrective scaling of the driving video frames will be performed in order to keep the driving face size close to the ideal face size. In one or more embodiments, the scaling threshold may be defined to have different values for scaling larger and scaling smaller. In other words, the threshold for when to perform corrective scaling may be set differently for when the driving face size is determined to be smaller than the ideal face size versus when the driving face size is determined to be larger than the ideal face size.

In STEP S310, the processor translates one or more of the subsequent video frames (i.e. frames coming after the calibration reference frame in the driving video) by a corrective offset, with respect to the fixed boundary box, in response to determining that the magnitude of the measured offset is greater than the translation threshold. In one or more embodiments, the corrective offset is defined to be equal in magnitude and opposite in direction from the measured offset between the driving face position and the ideal face position. In this way, applying the corrective offset to the subsequent video frames results in translating the driving face back to the ideal face position.

In STEP S315, one or more of the subsequent video frames (i.e. frames coming after the calibration reference frame in the driving video) are scaled with respect to the fixed boundary box, in response to determining that the measured scale factor is greater than the scaling threshold. In one or more embodiments, a corrective scale factor is the inverse fraction of the measured offset between the driving face size and the idea face size. In this way, applying the corrective offset to the subsequent video frames results in scaling the driving face back to the ideal face size, within an error tolerance.

Figure 4A:
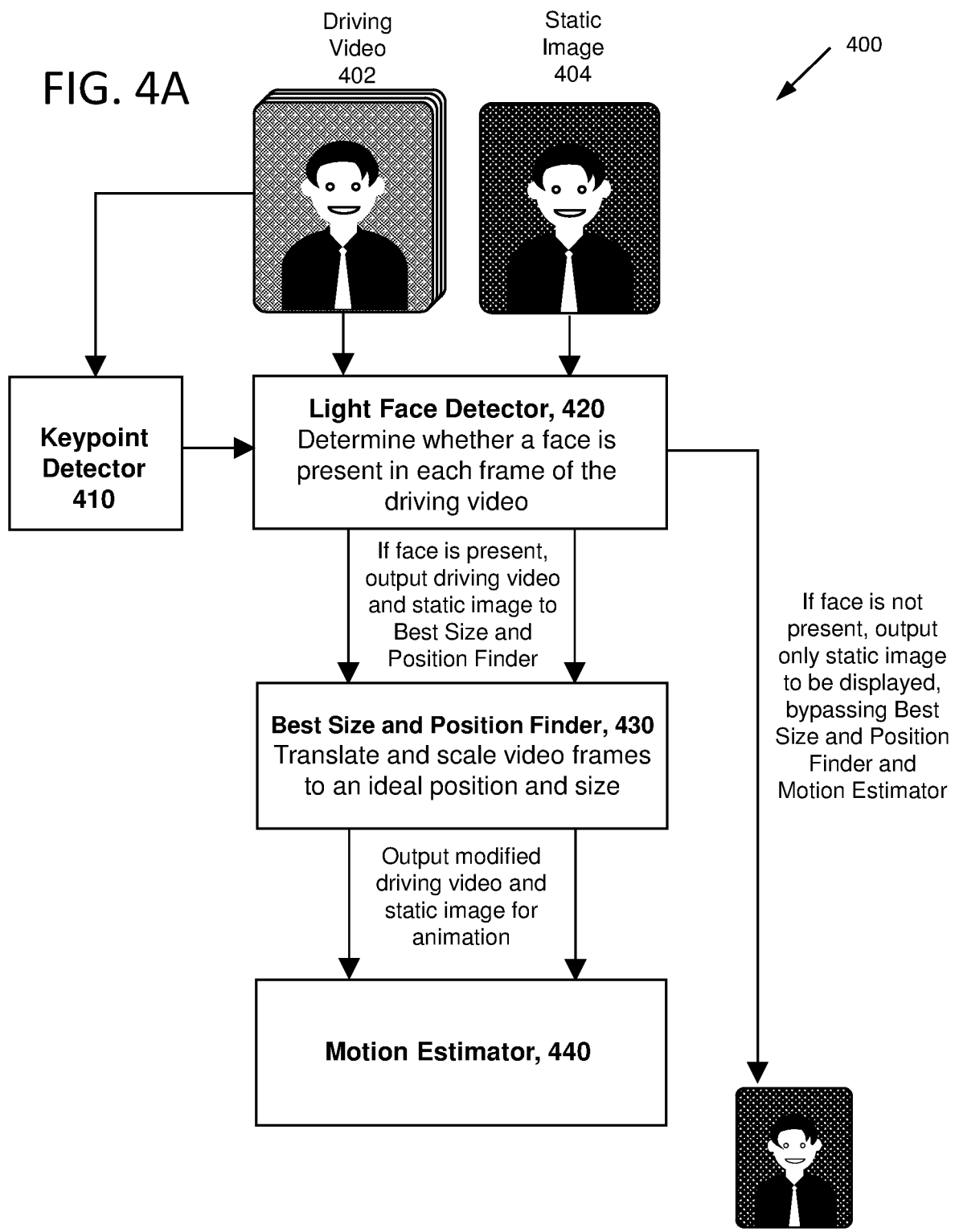
FIG. 4A shows a block diagram of an implementation of a method for calibrating an animation, in accordance with one or more embodiments of the invention.

FIG. 4A shows a block diagram of an implementation 400 of a method for calibrating an animation, in accordance with one or more embodiments of the invention. A light face detector 420 receives a driving video 402 from an image capturing device and a static image 404 from a memory. The driving video 402 is the video chosen to control the motion of the final animation, and the static image 404 is the image to be animated. The output of a keypoint detector 410 that has been applied to the driving video is also input into the light face detector 420. Using these inputs, the light face detector 420 determines whether a face is present in each frame of the driving video 402. If a face is not detected in the driving video, then the light face detector 420 outputs only the static image 404 to be displayed to a user. In this way, if no face is detected by the light face detector 420, then the static image is not animated during those frames. Rather a best size and position finder 430 and a motion estimator 440 are bypassed so that only the static image is displayed. If a face is detected by the light face detector 420, then the driving video 402 and the static image 404 are both output to the best size and position finder 430. Either continuously or in response to a trigger event, such as a keystroke on a keyboard, the best size and position finder 430 translates and scales the video frames from the driving video 402 to an ideal position and size. This ideal position and size are defined such that the face in the driving video is kept to a similar size and position as the face in the static image. The best size and position finder 430 outputs the modified driving video frames and the static image to the motion estimator 440 to be animated. In this way, the motion estimator 440 can receive the modified driving video frames that are optimal for producing high quality animation of the static image 404. In the implementation shown in FIG. 4, the keypoint detector 410, the light face detector 420, the best position and size finder 430, and the motion estimator 440 may be all implemented as instructions in a computer processor.

Figure 4B:
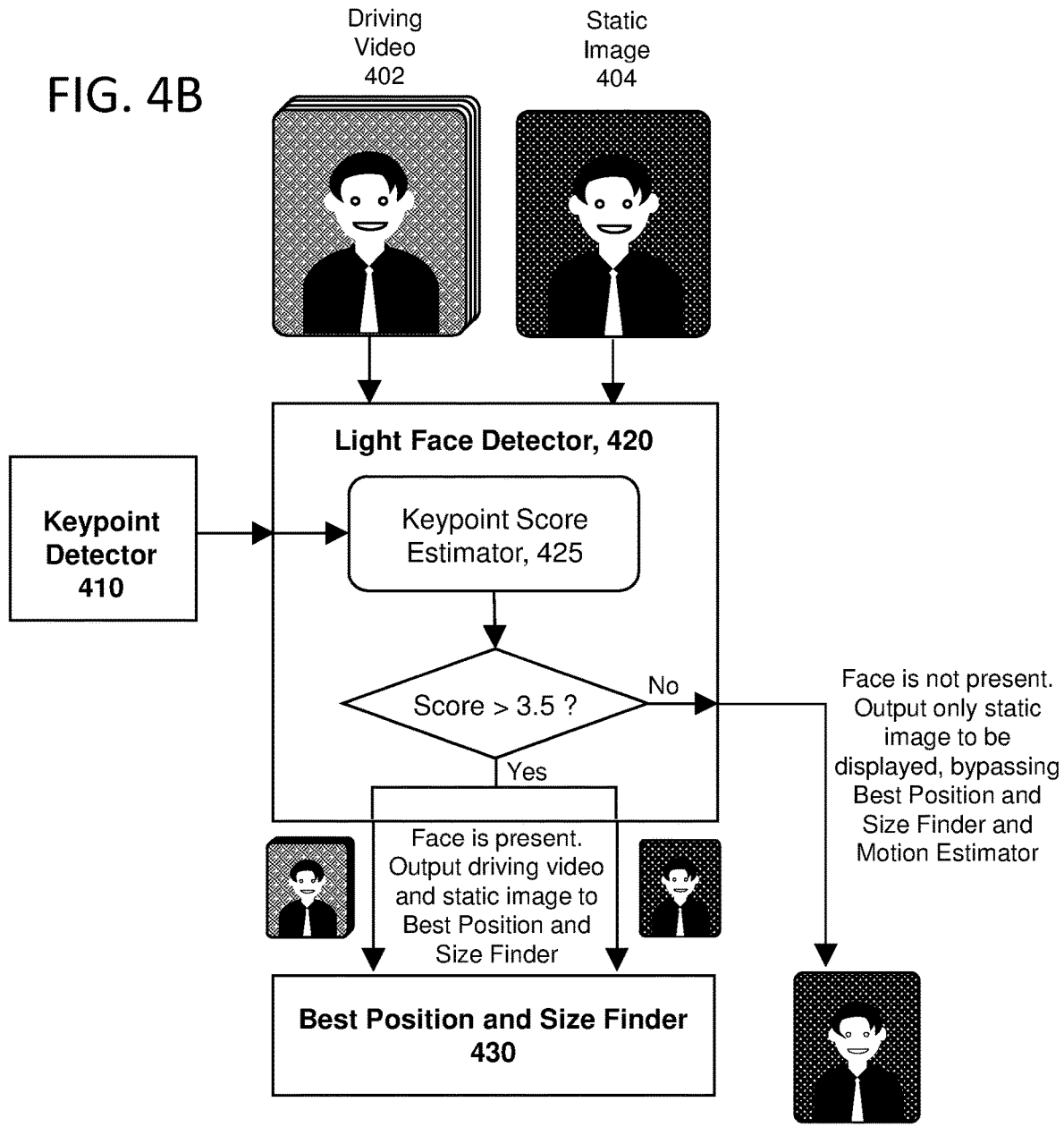
FIG. 4B shows a block diagram showing more detail of the light face detector from FIG. 4A, in accordance with one or more embodiments of the invention.

FIG. 4B shows a block diagram showing more detail of the operation of the light face detector 420 from FIG. 4A, in accordance with one or more embodiments of the invention. The keypoint score estimator 425 sets the score between 0 and 5 by determining the maximum value of the feature map obtained from the keypoint detector 410. If the score is greater than 3.5, then a face is present in the driving video. In this case, both the static image and the driving video are output to the best position and size finder 430. If the score is less than or equal to 3.5, then the static image 404, only, is output to be displayed, bypassing the best position and size finder 430 and the motion estimator 440. In this case, no face was detected by light face detector 420, and animation is stopped, displaying only the static image 404.

Figure 4C:
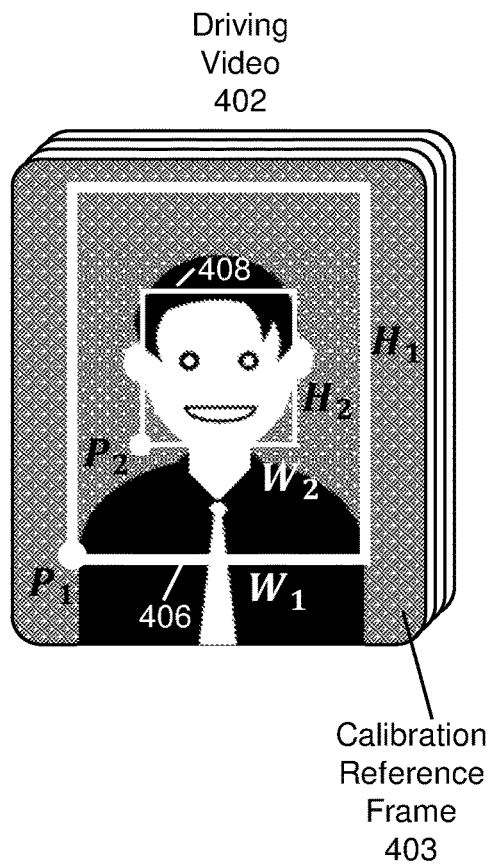
FIG. 4C shows an illustration of a calibration reference frame with a fixed boundary box and a driving face box, in accordance with one or more embodiments of the invention

FIG. 4C shows an illustration of a calibration reference frame 403 in the driving video 402. A driving face box 408 indicates the position and size of the driving face. The driving face box size is determined by the width $W_2$ and the height $H_2$, and the driving face box position is determined by the point $P_2$ at the bottom left corner of the driving face box 408. The fixed boundary box size is specified by the width $W_1$ and height $H_1$, and the fixed boundary box position is specified by the point $P_1$ at the bottom left corner of a fixed boundary box 406.

Figure 4D:
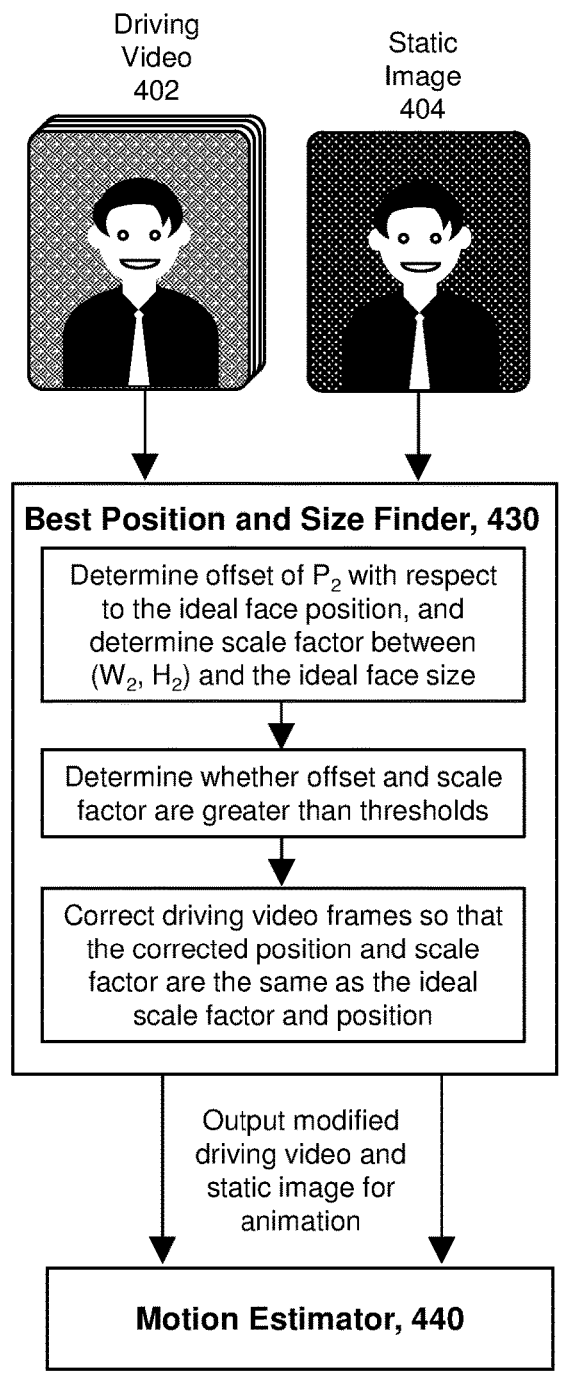
FIG. 4D shows a block diagram showing more detail of the best size and position finder from FIG. 4A, in accordance with one or more embodiments of the invention.

FIG. 4D shows a block diagram showing more detail of the operation of the best position and size finder 430. The driving video 402 and the static image 404 are input to the best position and size finder 430. The best position and size finder 430 determines the offset of $P_2$ (from the calibration reference frame 403) with respect to the ideal face position, and determines the scale factor between the width and height ($W_2$, $H_2$) and the ideal face size. The best position and size finder 430 determines whether the offset and the scale factor are greater than the translation and scaling thresholds for correction. If the scale factor or the offset is greater than the threshold, then the driving video frames will be corrected so that the corrected position and scale factor are the same as the ideal position and scale factor. In one or more embodiments, the driving video frames may be corrected to maintain the following conditions:

$$z_w W_2 - W_1 \le e_w$$

$$z_h H_2 - H_1 \le e_h$$

$$P_1 = T + P_2$$

where $z_w$ is the scale factor between the width of the fixed boundary box and the driving face box, $z_h$ is the scale factor between the height of the fixed boundary box and the driving face box, $e_w$ and $e_h$ are allowable errors for scaling the width and height respectively, and $T = \{t_{up}, t_{down}, t_{left}, t_{right}\}$ is the translation between $P_1$ and $P_2$. Here, $t_{up}, t_{down}, t_{left}, t_{right}$ are the translations that are maintained in each of the four possible directions (up, down, left, right). The driving video frames that have been corrected (modified driving video frames) and static image are output to the motion estimator 440 for animation.

Figure 5:
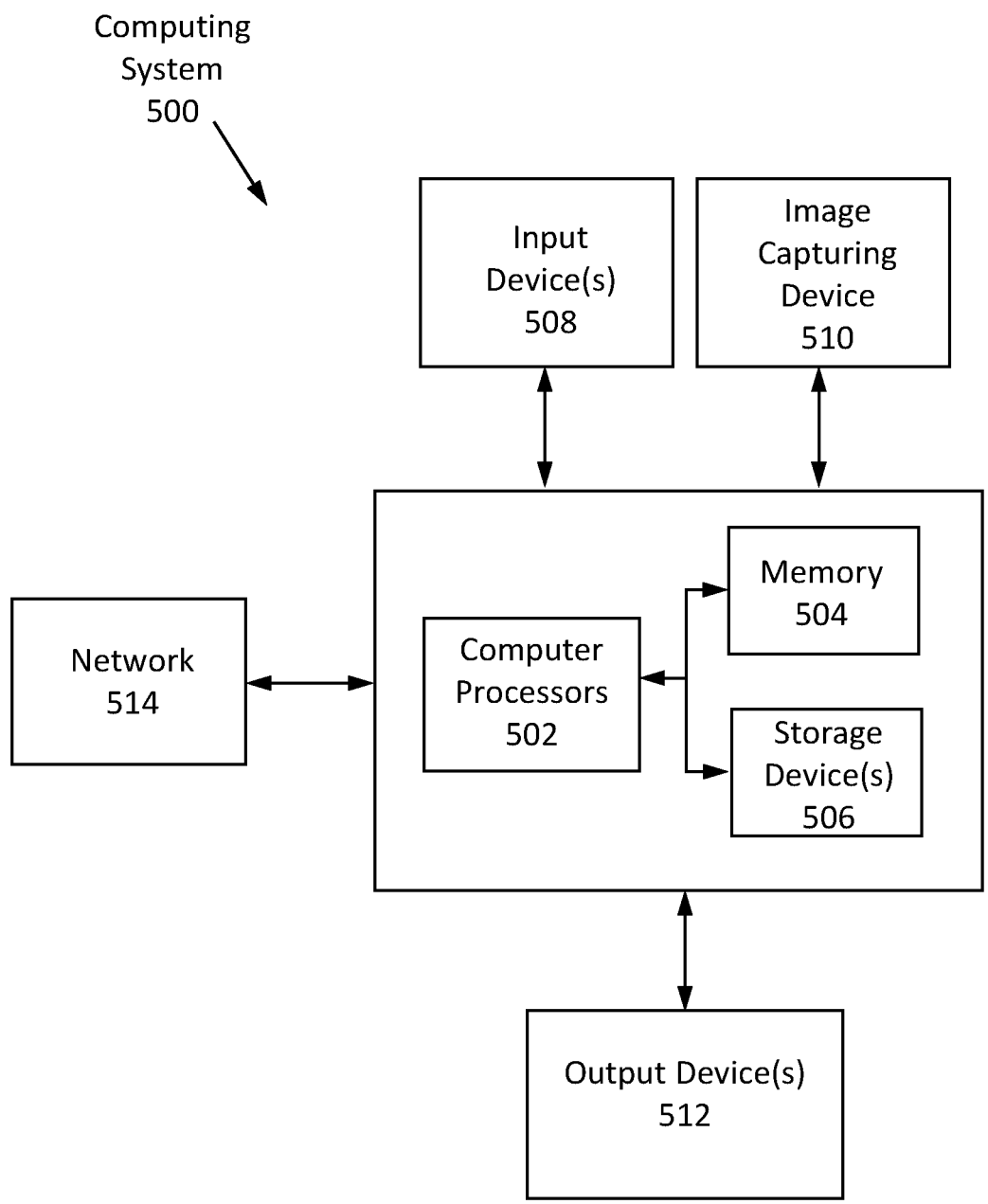
FIG. 5 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (508), such as a touchscreen, keyboard, mouse, microphone, touchpad, electronic pen, or any other type of input device. Further, the computing system (500) may include one or more output device(s) (512), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (514) (e.g., a local area network (LAN), a wide area network (WAN) such as the Internet, mobile network, or any other type of network) via a network interface connection (not shown). The input and output device(s) may be locally or remotely (e.g., via the network (514)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and be connected to the other elements over a network (514). Further, one or more embodiments of the invention may be implemented on a distributed system having a plurality of nodes, where each portion of the invention may be located on a different node within the distributed system. In one or more embodiments, the node corresponds to a distinct computing device. Alternatively, the node may correspond to a computer processor with associated physical memory. The node may alternatively correspond to a computer processor or micro-core of a computer processor with shared memory and/or resources.

In one or more embodiments, the memory (504) and/or the storage device (506) stores a static source image of a source face.

In one or more embodiments, the computing system (500) may include an image capturing device (510). The image capturing device captures a driving video comprising a plurality of driving video frames, wherein at least one of the driving video frames includes a driving face of a human. In one or more embodiments, the image capturing device may be a camera that can capture still images or video data.

One or more embodiments of the invention may have one or more of the following advantages and improvements over conventional technologies for calibrating animations from real-time user's motion: improving the quality of animations by ensuring that the face in the driving video is of a similar size and position to the face in the static image; preventing distortions (e.g., pose mismatching, distance and position mismatching, etc.) on video synthesis for the amination, such as distortions of the animated static image due to the face in the driving video being located and sized differently from the face in the static image, and distortions of the animated static image due to the face in the driving video being absent from the driving video. One or more of the above advantages may improve a user's ability maintain privacy or anonymity during video calls.

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method for calibrating an animation, the method comprising:
   obtaining a static source image of a source face;
   capturing, by an image capturing device, a driving video of a human, wherein the driving video comprises a plurality of driving video frames;
   determining whether a driving face, of the human, is present in each of the video frames;
   measuring a driving face position and a driving face size in a calibration reference frame of the driving video;
   generating each of one or more modified video frames based on the calibration reference frame and each of one or more subsequent video frames, wherein the generating comprises:

determining whether a measured offset, between the driving face position and an ideal face position, has a magnitude greater than a translation threshold, determining whether a measured scale factor, between the driving face size and an ideal face size, is greater than a scaling threshold, translating the one or more subsequent video frames, by a corrective offset, with respect to a fixed boundary box, in response to determining that the magnitude of the measured offset is greater than the translation threshold, and scaling the one or more subsequent video frames by a corrective scale factor, with respect to the fixed boundary box, in response to determining that the measured scale factor is greater than the scaling threshold, and outputting, for each of the driving video frames, the source image in response to determining that the driving face is not present, and outputting the source image and the modified video frame in response to determining that the driving face is present.

2. The method of claim 1, wherein the determining of whether the driving face is present further comprises:
setting a score by determining an average value of a feature map from a keypoint detection; and
determining that the driving face is present if the score is greater than a predetermined value, and determining that the driving face is not present if the score is less than or equal to the predetermined value.

3. The method of claim 1, wherein the calibration reference frame is selected by a keystroke on a keyboard.

4. The method of claim 1, wherein the calibration reference frame is continuously updated with a predetermined periodicity.

5. The method of claim 1, wherein the measurement of the driving face position and size further comprises:
specifying, within the calibration reference frame, the fixed boundary box that is defined by parameters including:
a boundary box width,
a boundary box height, and
a boundary box position defined by a corner of the fixed boundary box;
determining, by facial recognition, a driving face box that encloses the driving face and is defined by parameters including:
a driving face box width,
a driving face box height, and
a driving face box position defined by a corner of the driving face box that corresponds to the similar corner of the fixed boundary box, wherein
the driving face size is determined by the driving face box width and the driving face box height, and
the driving face position is determined by the driving face box position.

6. The method of claim 5, wherein
the ideal face position is defined by a condition where the driving face box position is located at a predetermined ideal offset from the boundary box position, and
the ideal face size is defined by a condition where the driving face box width is a predetermined fraction of the boundary box width, and the driving face box height is a predetermined fraction of the boundary box height within an error tolerance.

7. A non-transitory computer readable medium (CRM) storing computer readable program code for calibrating an animation, the computer readable program code causes a computer to:
obtain a static source image of a source face;
capture, by an image capturing device, a driving video of a human, wherein the driving video comprises a plurality of driving video frames;
determine whether a driving face, of the human, is present in each of the video frames;
measure a driving face position and a driving face size in a calibration reference frame of the driving video;
generate each of one or more modified video frames based on the calibration reference frame and each of one or more subsequent video frames, wherein the generating comprises:
determining whether a measured offset, between the driving face position and an ideal face position, has a magnitude greater than a translation threshold,
determining whether a measured scale factor, between the driving face size and an ideal face size, is greater than a scaling threshold,
translating the one or more subsequent video frames, by a corrective offset, with respect to a fixed boundary box, in response to determining that the magnitude of the measured offset is greater than the translation threshold, and
scaling the one or more subsequent video frames by a corrective scale factor, with respect to the fixed boundary box, in response to determining that the measured scale factor is greater than the scaling threshold, and
output, for each of the driving video frames, the source image in response to determining that the driving face is not present, and output the source image and the modified video frame in response to determining that the driving face is present.

8. The non-transitory CRM of claim 7, wherein the determining of whether the driving face is present further comprises:
setting a score by determining an average value of a feature map from a keypoint detection; and
determining that the driving face is present if the score is greater than a predetermined value, and determining that the driving face is not present if the score is less than or equal to the predetermined value.

9. The non-transitory CRM of claim 7, wherein the calibration reference frame is selected by a keystroke on a keyboard.

10. The non-transitory CRM of claim 7, wherein the calibration reference frame is continuously updated with a predetermined periodicity.

11. The non-transitory CRM of claim 7, wherein the measurement of the driving face position and size further comprises:
specifying, within the calibration reference frame, the fixed boundary box that is defined by parameters including:
a boundary box width,
a boundary box height, and
a boundary box position defined by a corner of the fixed boundary box;
determining, by facial recognition, a driving face box that encloses the driving face and is defined by parameters including:
a driving face box width,
a driving face box height, and a driving face box position defined by a corner of the driving face box that corresponds to the similar corner of the fixed boundary box, wherein the driving face size is determined by the driving face box width and the driving face box height, and the driving face position is determined by the driving face box position.

12. The non-transitory CRM of claim 11, wherein the ideal face position is defined by a condition where the driving face box position is located at a predetermined ideal offset from the boundary box position, and the ideal face size is defined by a condition where the driving face box width is a predetermined fraction of the boundary box width, and the driving face box height is a predetermined fraction of the boundary box height within an error tolerance.

13. A system for calibrating an animation, the system comprising:

a memory that stores a static source image of a source face;

an image capturing device that captures a driving video of a human, wherein the driving video comprises a plurality of driving video frames;

a processor coupled to the image capturing device and the memory, wherein the processor:

obtains the static source image;

determines whether a driving face, of the human, is present in each of the video frames;

measures a driving face position and a driving face size in a calibration reference frame of the driving video;

generates each of one or more modified video frames based on the calibration reference frame and each of one or more subsequent video frames, wherein the generating comprises:

determining whether a measured offset, between the driving face position and an ideal face position, has a magnitude greater than a translation threshold, determining whether a measured scale factor, between the driving face size and an ideal face size, is greater than a scaling threshold, translating the one or more subsequent video frames, by a corrective offset, with respect to a fixed boundary box, in response to determining that the magnitude of the measured offset is greater than the translation threshold, and scaling the one or more subsequent video frames by a corrective scale factor, with respect to the fixed boundary box, in response to determining that the measured scale factor is greater than the scaling threshold; and outputs, for each of the driving video frames, the source image in response to determining that the driving face is not present, and outputs the source image and the modified video frame in response to determining that the driving face is present.

14. The system of claim 13, wherein the determining of whether the driving face is present further comprises:

setting a score by determining an average value of a feature map from a keypoint detection; and determining that the driving face is present if the score is greater than a predetermined value, and determining that the driving face is not present if the score is less than or equal to the predetermined value.

15. The system of claim 13, wherein the calibration reference frame is selected by a keystroke on a keyboard.

16. The system of claim 13, wherein the calibration reference frame is continuously updated with a predetermined periodicity.

17. The system of claim 13, wherein the measurement of the driving face position and size further comprises:

specifying, within the calibration reference frame, the fixed boundary box that is defined by parameters including:

a boundary box width, a boundary box height, and a boundary box position defined by a corner of the fixed boundary box;

determining, by facial recognition, a driving face box that encloses the driving face and is defined by parameters including:

a driving face box width, a driving face box height, and a driving face box position defined by a corner of the driving face box that corresponds to the similar corner of the fixed boundary box, wherein the driving face size is determined by the driving face box width and the driving face box height, and the driving face position is determined by the driving face box position.

18. The system of claim 17, wherein the ideal face position is defined by a condition where the driving face box position is located at a predetermined ideal offset from the boundary box position, and the ideal face size is defined by a condition where the driving face box width is a predetermined fraction of the boundary box width, and the driving face box height is a predetermined fraction of the boundary box height within an error tolerance.

* * * * *